United States Patent [19]

Saunders

[11] 4,296,733
[45] Oct. 27, 1981

[54] HEATING, LIGHTING AND VENTILATION SYSTEMS

[76] Inventor: Norman B. Saunders, 15 Ellis Rd., Weston, Mass. 02193

[21] Appl. No.: 712,098

[22] Filed: Aug. 5, 1976

[51] Int. Cl.³ .............................................. F24J 3/02
[52] U.S. Cl. .................................... 126/428; 126/430; 126/431; 126/419; 165/48 S
[58] Field of Search ............... 126/270, 271, 419, 428, 126/430, 431, 436, 437, 444, 450, 901; 237/1 A; 52/732; 165/48 S

[56] References Cited

U.S. PATENT DOCUMENTS

| | | | |
|---|---|---|---|
| 246,626 | 9/1881 | Morse | 126/270 |
| 2,425,797 | 8/1947 | Gillespie | 237/1 A |
| 2,595,905 | 5/1952 | Telkes | 126/271 |
| 2,601,905 | 7/1952 | Anderegee | 126/270 |
| 2,857,634 | 10/1958 | Garbade et al. | 126/270 |
| 2,958,259 | 1/1960 | Ewing | 350/259 |
| 3,001,331 | 9/1961 | Brunton | 126/270 |
| 3,048,375 | 8/1962 | Walker | 126/270 |
| 3,288,206 | 11/1966 | Beeler | 237/1 A |
| 3,333,386 | 8/1967 | Mora | 52/732 X |
| 3,450,192 | 6/1969 | Hay | 237/1 A |
| 3,937,208 | 2/1976 | Katz et al. | 126/271 |
| 3,952,947 | 4/1976 | Saunders | 126/270 |
| 3,990,635 | 11/1976 | Restle et al. | 126/270 |
| 4,051,999 | 10/1977 | Granger et al. | 126/400 |

FOREIGN PATENT DOCUMENTS 2326676 12/1974 Fed. Rep. of Germany ...... 126/400

*Primary Examiner*—Larry Jones
*Attorney, Agent, or Firm*—Schiller & Pandiscio

[57] ABSTRACT

A novel solar heat and light control device is described for controlling the amount of solar heat and light entering an enclosed structure and for minimizing the amount of interior heat loss from the structure. The device comprises a first plurality of vertically-oriented transparent substantially flat members which are mounted with a second plurality of horizontally-oriented reflective members on the enclosed structure so as to form a "staircase" construction so that incoming solar radiation, the direction of which varies according to the altitude and azimuth of the sun, is transmitted through the vertical members when the sun is at average winter altitudes and reflected when the sun is at average summer altitudes. The control device is preferably mounted between transparent planar panel assemblies. Novel heat storing means as well as an improved ventilation system useful with the solar heat and light control device are also disclosed.

30 Claims, 15 Drawing Figures

HEATING, LIGHTING AND VENTILATION SYSTEMS

This invention relates to lighting, heating, ventilating and air conditioning systems and more particularly to a system for naturally controlling the light, temperature and ventilation within an enclosed structure.

With the advent of the energy crisis, a great deal of attention is now being directed to the development of systems and methods of harnessing solar energy, i.e., the accumulated power received from the sun. These systems usually include any one of several devices, such as flat plate collectors, for trapping the heat from the sun and transferring it to a fluid medium. The systems also usually include means, such as a tank, for storing the heated fluid. These systems, however, are usually inefficient in the amount of heat actually converted and used since the heat usually must undergo multiple transmissions. For example, in one type of system the heat energy first must heat the metal of a collector, whereupon it is transferred to a fluid, and from the fluid to the wall of a heat exchanger. The heat energy is then transferred to a storage tank fluid, through the metal of a fluid conductor, where it is transferred to the air so that it can be circulated in the room which is to be heated. More efficient systems use the sun beams directly to heat the enclosed space but suffer in that heat is stored only by allowing the temperature of the enclosed space to cycle. As a consequence the temperature usually rises and heat is stored only when the sun is shining. Conversely, when the sun is no longer shining, particularly at night the stored heat is used and the temperature will fall relatively quickly. Although it has been suggested to reduce heat losses from the building by adding additional sheets of glazing, such additional sheets of glazing also may tend to reduce the amount of incoming radiation due to added reflective losses.

It is therefore a general object of the present invention to provide an improved lighting, heating, ventilating and air conditioning system in which substantially all power required comes directly from the sun and wind.

It is another object of the present invention to provide a solar heat and light control device for selectively controlling the transmission of solar heat and light into an enclosed structure as a function of the time of year and for minimizing the amount of heat loss from the structure.

It is a further object of the present invention to provide a solar heating system having an improved heat storage.

Still another object of the present invention is to provide an efficient heat storage system in which the amount of incoming solar heat is more efficiently used.

Yet another object of the present invention is to provide a heat storage system in which the distances between the heat absorbtion surface, the heat store, and the interior of the living space is substantially minimized so that the temperature difference therebetween is minimized.

And still another object of the present invention is to provide a relatively inexpensive heat store which utilizes ordinary building construction materials.

And yet another object of the present invention is to provide an improved heating and ventilating system in which heat losses and condensation of moisture are substantially reduced.

And still another object of the present invention is to provide an improved heating and ventilation system.

And yet another object of the present invention is to provide an improved window shade assembly useful with a window ventilation system.

And still another object of the present invention is to provide an improved member for joining two adjacent confronting horizontal edges of two panels in an overlapping manner.

These and other objects are achieved by a device for controlling the amount of solar heat and light entering an enclosed structure and for minimizing the amount of interior heat loss from the structure wherein the device comprises a first plurality of substantially flat members transparent to the solar heat and light and a second plurality of substantially flat members reflective to solar heat and light as well as the interior heat. The first and second plurality of substantially flat members are capable of being supported by the enclosed structure so that the first plurality are all oriented in substantially vertical planes and the second plurality are all oriented in substantially horizontal planes, to form a "staircase" construction and so that incoming solar radiation, the direction of which varies according to the altitude and azimuth of the sun, is transmitted through the vertical members when the sun is at average winter altitudes and reflected when the sun is at average summer altitudes. The controlling device is preferably disposed between two planar panel assemblies, both substantially transparent to solar heat and light. Novel means are provided for storing heat transmitted into the enclosed structure through the staircase construction. Further, an improved ventilation system is provided for recovering and minimizing interior heat losses.

Other objects of the invention will in part be obvious and will in part appear hereinafter. The invention accordingly comprises the apparatus comprising the construction, combination of elements, and arrangement of parts which are exemplified in the following detailed disclosure and the scope of the application of which will be indicated in the claims.

For a fuller understanding of the nature and objects of the present invention, reference should be had to the following detailed description taken in connection with the accompanying drawings wherein.

In the drawings the same numerals refer to like parts.

Figure 1:
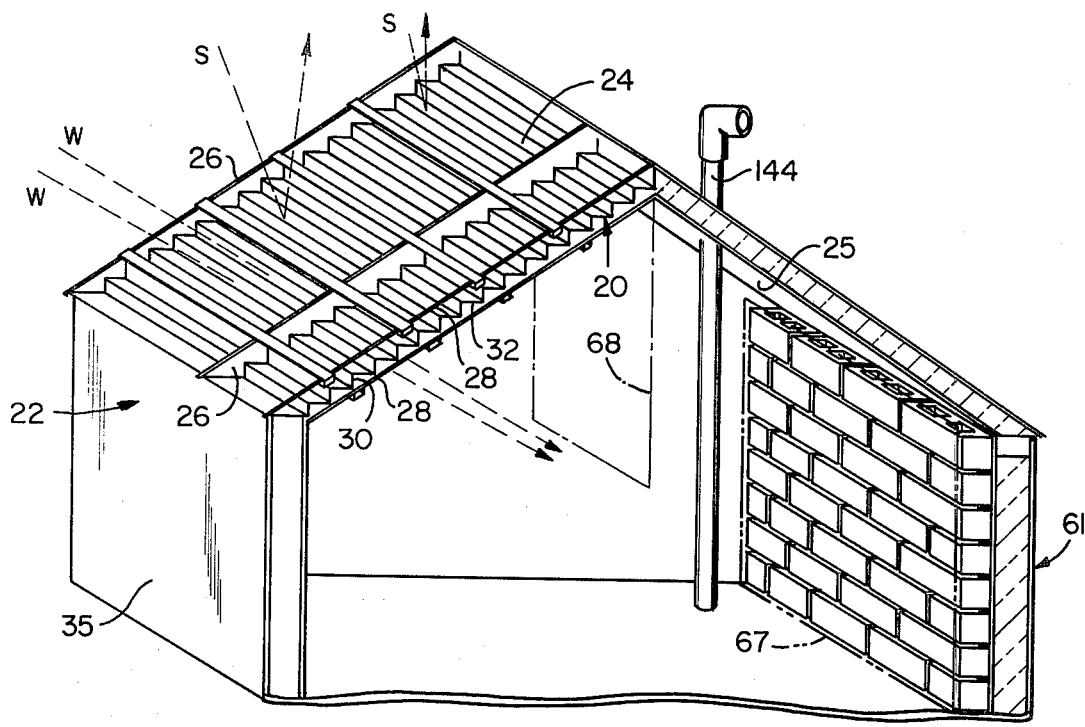
FIG. 1 is a cross-sectional persepctive view of an enclosed structure provided with a first embodiment of the solar heat and light control device of the present invention.

Referring to FIG. 1, solar heat and light control device 20, made in accordance with the present invention, is mounted between two planar panel assemblies 28 on sloped roof 24 opposite the sloped roof 25 of building 22 so that the control device 20 faces equatorially. More specifically, in northern latitudes, control device 20 is mounted on the southern roof, while in southern latitudes, control device 20 is mounted on the northern roof. Device 20 may be mounted in any suitable manner to the roof supporting structure such as rafters 26, the rafters preferably being provided with a coating 27 (see FIG. 4), absorptive to room temperature heat and reflective to both sun heat and sun light.

Control device 20 includes first and second plurality of substantially flat members 30 and 32. Members 30 are transparent to solar radiation and in particular to heat and light provided by the sun; while members 32 are reflective to this radiation as well as reflective to the heat within building 22. Members 30 and 32 are positioned between panel assemblies 28 to rafters 26 with members 30 oriented in substantially vertical planes and facing equatorially, and members 32 oriented in a substantially horizontal planes. The top edge of each vertically-oriented member 30 is secured to the front edge of a horizontally-oriented member 32, while the bottom edge of member 30 is secured to the rear edge of another member 32 so as to form a construction similar to a "staircase", wherein members 30 form the "risers" and members 32 form the "treads". The height of each member 30 (the distance between the top and bottom edges of the member) and the width of each member 32 (the distance between the front and rear edges) is dependent on the slope of roof 24. The length of members 30 and 32 are sufficient so that they can be attached to rafters 26 without intervening gaps whereby heat, light and air could pass therebetween.

Figure 2:
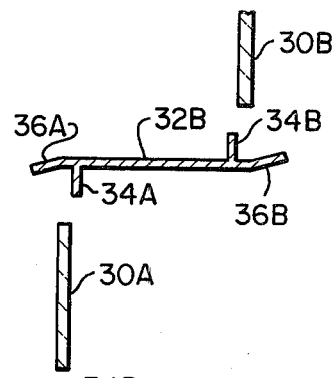
FIG. 2 is a cross-sectional, exploded view of an embodiment of the solar heat and light control device disassembled.
Figure 3:
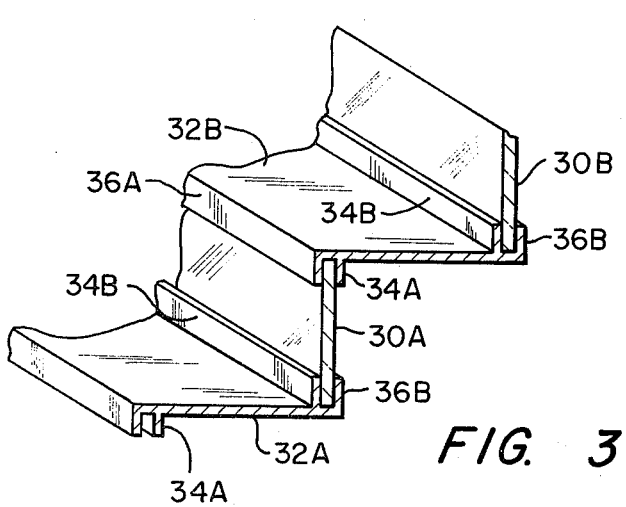
FIG. 3 is a cross-sectional perspective view of the solar heat and light control device of FIG. 2 assembled for use.
Figure 4:
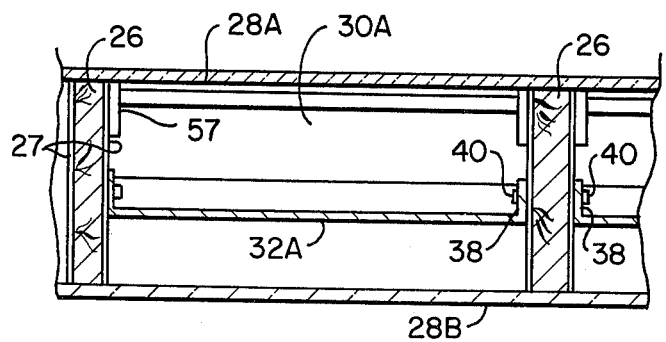
FIG. 4 is a longitudinal-sectional, fragmented view of the solar heat and light control device attached in place to rafters of a building.
Figure 5:
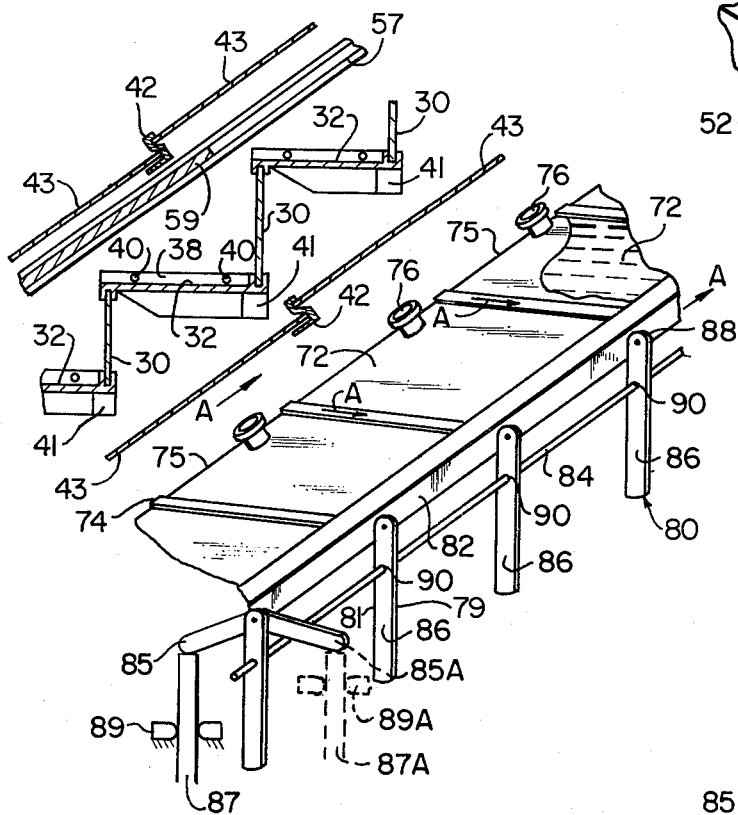
FIG. 5 is a cross-sectional view of a modified solar heat control device together with one form of a heat store used in the present invention.

Members 30 and 32 may be constructed and installed in various ways. Referring to FIGS. 2-4 each member 30 can be formed by cutting rectangular sheets of transparent material such as glass or a hard plastic material e.g., methacrylate, to the size desired. Preferably, each member 30 is treated, such as with a coating of tin oxide, so as to reflect building heat and so as to transmit sun heat and sun light. Members 32 are formed by cutting sheets of reflective material, such as aluminum, or a material with a suitable reflective metallic coating. Reflective members 32 are provided with two spacing tabs 34A and 34B disposed longitudinally on opposite sides of and close to opposite longitudinal edges of each member 32. The longitudinal edges of each member 32 are preferably provided with bendable tabs 36A and 36B, each being bendable toward the adjacent tabs 34 in order to lock a transparent member 30 between the particular tab 34 and tab 36. As shown in FIG. 4, the side edges of each member 32 are provided with tabs 38 which are attached directly to the rafters 26 by suitable means such as screws or bolts 40 or, in the alternative, cleats (not shown) can be provided on the rafters 26 and the side edges of each member 32 secured to the cleats. Further, as shown in FIG. 5, members 32 can be formed in a wedge-shaped configuration of a sufficient thickness so as to provide a brace support for members 26 and to reduce outward heat conduction.

The staircase construction formed by members 30 and 32 is easily assembled and preferably the members are secured between the rafters from the bottom of the roof upwardly. Specifically, as shown in FIG. 2-4, a horizontal member 32A is secured in place to rafters 26 by bolts 40 which extend through the tabs 38. Tabs 36A of member 32A is then secured to the top of wall 35 (FIG. 1) in any suitable manner such as bolts similar to bolts 40, with tab 34A of member 32A being bent if necessary. Member 30A is then oriented in a vertical direction over the member 32A, with its bottom edge placed against tab 34B of member 32A. Tab 36B of member 32A is bent to secure the member 30A along its bottom longitudinal edge to the member 32A. In a similar manner a second member 32B is then oriented in a horizontal plane and brought over vertically-oriented member 30A whereupon the front longitudinal edge of member 32B is secured to the top longitudinal edge of the vertically-oriented member 30A by clamping the top longitudinal edge of the vertically-oriented member 30A between tabs 34A and 36A of the front longitudinal edge of member 32B. The process continues until all the members are secured in place. The spaces, if any, between rafters 26 on the one hand and vertically and horizontally-oriented members 30 and 32 are then filled with suitable material such as room temperature vulcanizing silicone rubber in order to insure a tight-fitting relationship between the rafters and the member. The control device 20 thus constructed may be strong enough to supply the necessary bridging between the rafters 26 or they may be of light weight construction with separate bridging beams as shown at 41 in FIG. 5.

Figure 6:
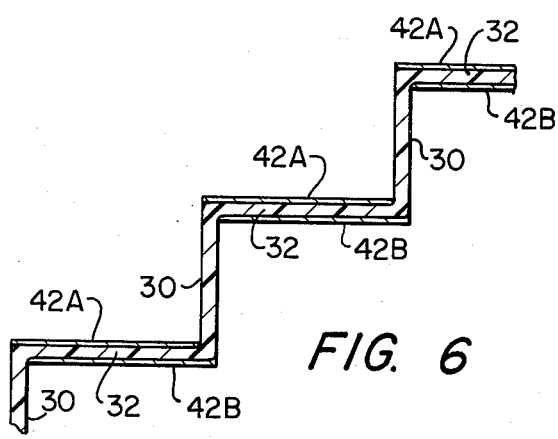
FIG. 6 is a cross-sectional view of another embodiment of the solar heat and light control device made in accordance with the present invention.

Further, control device 20 can be constructed and installed in other manners without departing from the invention. For example, referring to FIG. 6, the vertical members 30 can be integrally formed with the horizontal sections 32, by molding the entire unit of a thermoplastic material such as methcrylate. In this embodiment the upper surfaces of the horizontal members 32 are provided with coating 42A of a material, such as aluminum or like material, reflective to the sun's heat and light and the heat within the building. Preferably, the bottom surfaces of each of horizontal members 32B are also provided with a similar reflective coating 42B so as to improve the amount of back reflection of heat enclosed within building 22 thereby decreasing the amount of heat loss.

Also, in order to increase the amount of incoming solar heat trapped within the living area, the exposed underside of roof 25 opposite control device 20 is provided with a suitable material such as a metalized mylar, which specularly reflects the sun power while absorbing room temperature radiant heat.

Figure 7:
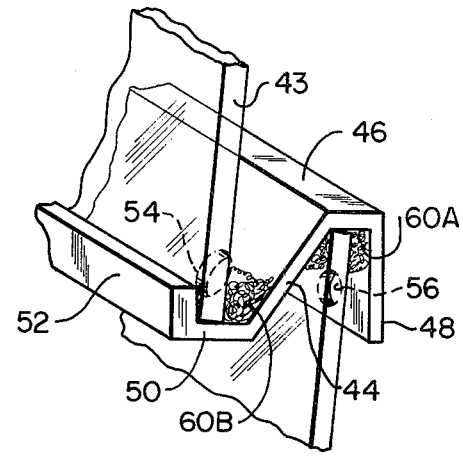
FIG. 7 shows a bracket for securing the transparent planar panels utilized in the present invention.

Generally, control device 20 is secured to rafters 26, below a planar panel assembly 28A transparent to solar heat and light. Assembly 28A may be supported solely by rafters 26, or may also be directly supported by control device 20. In the latter situation, the top and bottom edges of the vertical members 30 may be provided with protruding teats or similar means for directly contacting the inner surfaces of the assembly 28 for supporting the same. Assembly 28A is preferably sloped along roof 24. The slope angle of assembly 28A (an angle between 20 and 40 degrees being typical) is not critical and largely depends upon what is aesthetically pleasing and constructionally safe. The slope angle, however, must not be so steep so as to allow the noon-time winter sun to approach within a few degrees of being perpendicular to the general plane of the assemblies 28B since in this relative orientation, sun heat will be lost as a result of reflection off the lower assemblies 28B. Assembly 28A is made of a plurality of glazing units 43 which are sealed along their adjacent, vertical edges in a manner well known in the art such as with rubber stripping and, as shown in FIG. 5, secured together along their horizontal edges in an overlapping manner by brackets 42. Each bracket 42, shown in FIG. 5 and in greater detail in FIG. 7, includes an elongated member having center section 44 joined along one edge to mounting plate 48 by web 46. The opposite longitudinal edge of center section 44 is secured to lip 52 by second web 50 which extends from center section 44 in a direction opposite web 46. The bracket thus is formed in an Z or S-shaped cross-sectional configuration wherein oppositely-directed grooves or channels, formed by center section 44, web 46 and mounting plate 48 on the one hand and center section 44, web 50 and lip 52 on the other, receive two overlapping glazing units 43 with the lip 52 forming with the unit 43 a drainage channel. In order to attach brackets 42 to rafters 26, suitable apertures 54 and 56 are provided in center section 44 and mounting plate 48, respectively, so that a mounting screw or bolt (not shown) can be inserted in the apertures and the bracket and secured to rafters 26. It will be appreciated that lip 52 acts as a drainage conduit for rain falling on the outside of the glazing units as well as any condensate forming on the inside of the glazing units. In such a situation, the water draining is deposited onto the exterior of the next lower member 43. Further, as well known in the art, deformable resilient pads 60 can be provided in each of the grooves formed by bracket 42 between center section and each unit 43 in order to absorb normal shock vibrations between each of the glazing units and the bracket and to provide a seal between each unit and the bracket.

In one embodiment of the present invention, a planar panel assembly 28B, substantially identical to assembly 28A is spaced from and positioned below control device 20 so that its general plane is substantially parallel to the general plane of panel assembly 28A. Both assemblies 28A and B may be sealed around their peripheral edges so as to form a sealed chamber between the assemblies. This chamber can be evacuated or filled with a fluid such as a low thermal conductivity gas, e.g. neon, zenon or a low boiling point fluoro-carbon, so that the chamber acts as a heat barrier with respect to the interior heat which otherwise might be lost by conduction, radiation and convection from the inside of building 22 through panel assemblies 28.

When control device 20 is installed in roof 24 and the panel assemblies 28 are secured in place, the device 20 and panel assemblies 28 control the amount of solar heat and light entering the building 22, and minimize the amount of interior heat loss from the building. As shown by the dotted lines in FIG. 1 the incoming solar radiation is transmitted through the vertical members 30 of the control device 20 when the sun is at average winter altitudes (indicated by dotted lines W) either directly or by reflection off each pair of horizontally-oriented members 32. In the latter situation, sun-power reflected by the top of each horizontally oriented member 32 enters through the vertically-oriented member 32 to continue into the building parallel to and slightly displaced from its original direction. The incoming solar radiation, however, is mostly reflected away when the sun is at average summer altitudes (indicated by dotted lines S) by reflection off the top of each horizontally-oriented member 32 because of the geometry of control device 20 and the inherent reflective properties of vertical members 30.

Parallel shade tracks 57 (see FIGS. 4 and 5) can be provided on opposing faces of rafters 26 so that a retractable, substantially light and heat reflective shade 59 is movable into position, by any suitable means known in the art between control device 20 and the outer panel assembly 28A in order to retain heat within the building during cold winter nights and to prevent summer heating during warm summer days. Preferably, the shade is extended in the spring and retracted in the fall so that the shade need be operated only twice a year. The shade may be made of any type of material known in the art, metallized plastic (capable of transmitting, for example, about 5% of the sunlight) being preferred. As well known in the art, the shade may be stored on a spring-biased roller and drawn by suitable means such as a cord or the like. Further, the position of the shade can be controled by photocells as taught by my U.S. Pat. No. 3,952,947 issued Apr. 27, 1976.

Figure 8:
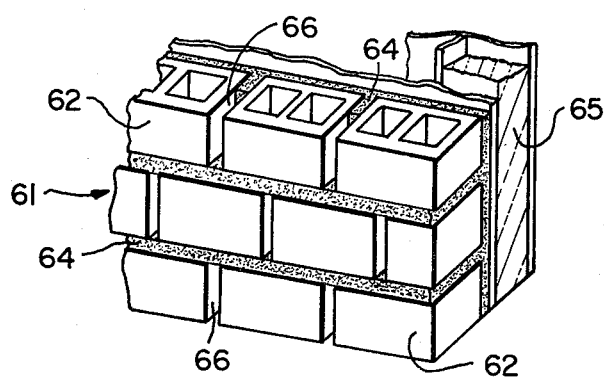
FIG. 8 is a perspective view of a second embodiment of a heat store used in the present invention.

Various heat stores can be employed for storing heat transmitted through control device 20 so that the temperature within the building is regulated more evenly. The heat stores can take any one of several forms. Novel heat store means can be employed which comprise standard construction materials or heat tanks. The first type of novel heat store is shown in FIG. 1, and in greater detail in FIG. 8. The heat store comprises the use of wall 61 opposite sloped roof 24 which wall preferably comprises blocks 62 of a heat absorbing material such as concrete or other construction material. The blocks are stacked in accordance with techniques well known in the art and mortar 64, or other similar construction material is provided along the horizontal joints. Each of the vertical joints between the blocks, however, is only partially filled with mortar, so as to seal the outer surface of the wall, so that a space between the vertical joints of the blocks remains empty on the interior as shown at 66. Spaces 66 provide exposed additional surfaces of the block to the air and radiation in the building so that heat may be transferred more readily between the block 62 and the room. As a consequence, the total amount of heat transfer surface area is increased relative to that normally provided by such block walls. Insulation 65 is provided between the blocks 62 and the exterior wall in order to reduce heat loss through the exterior wall. Where it is desirable to regulate the amount of heat stored and released by wall 61, curtains may be hung for example, as shown in FIG. 1, from the top of wall 60 as shown at 67, or curtains may be hung from the roof as shown at 68. Curtain 68, preferably fixed in place, is made of a thin, light-weight material, such as polyvinyl chloride, transparent to all sunlight and sun heat while reflective to room heat radiation so as to prevent the transfer of the room temperature heat therethrough by either radiation or convection. Curtain 67 is preferably made of a heat absorptive material and is retractable so that when extended it prevents heat from being transmitted to and from wall 61, and when retracted heat is allowed to freely pass.

Figure 9:
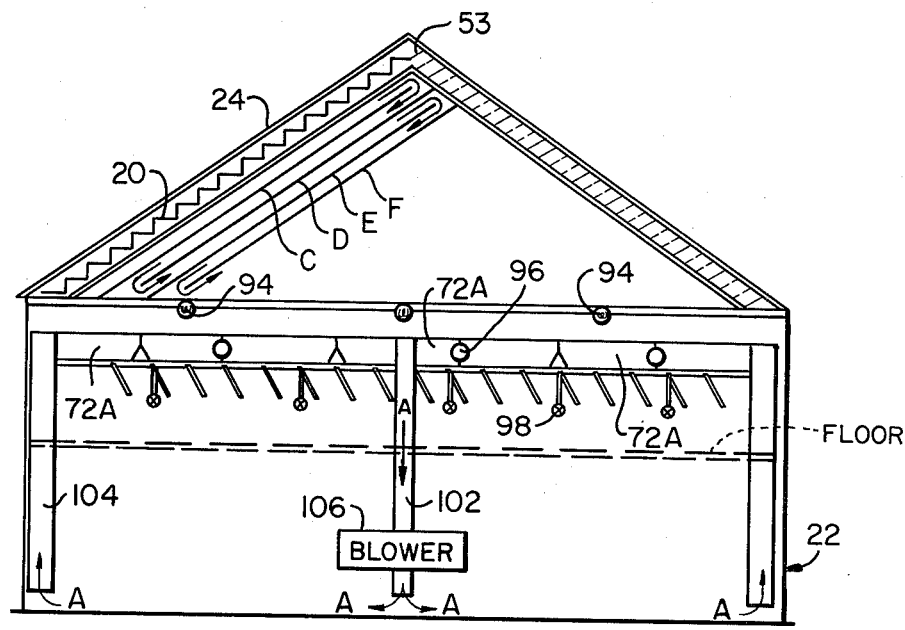
FIG. 9 shows a heating and ventilation system made in accordance with the present invention.

An alternative heat store can be employed either adjacent roof 24 as shown in FIG. 5 or in the ceiling as shown in FIG. 9. Referring to FIG. 5 the heat store comprises a plurality of tanks 72 each made of a material, such as methacrylate, which is highly transmissive to both solar heat and light and stacked one above the other on corresponding support shelves 74. Tanks 72 are shaped so that the walls of the tank are planar and may be disposed at any acute angle between the horizontal and at an angle with respect to the horizontal parallel to the closest panel assembly 28B. Thus, tanks 72 may be shaped in a parallelepiped configuration (although other configurations can be used) so that wall 75 of each tank closest to panel assembly 28B essentially is parallel with the panels so as to minimize any reflection off the tank surfaces of the solar heat and light transmitted through vertical member 30. The tanks preferably cover the entire area below the internal panel assembly 28B so that all solar heat and light transmitted through panel members 28B and control device 20 is transmitted to and mostly through the tanks. Each tank is provided with inlet spout 76 so that it can be filled with a suitable light-transmitting, heat-absorbing material such as water, a copper sulfate solution, or one of the various materials described in U.S. Pat. No. 2,595,905 issued to Telkes.

Figure 5A:
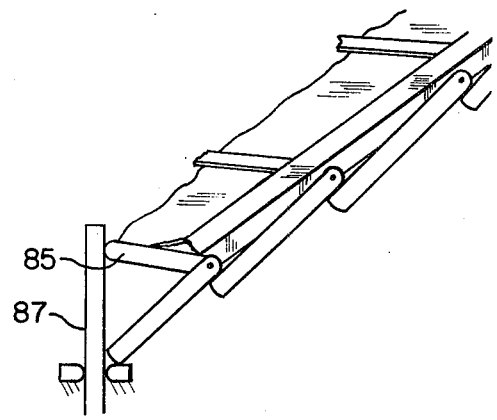
FIG. 5A is a cross-sectional view of the blind assembly of the FIG. 5 embodiment, in a closed position.

Blind assembly 80 is preferably employed in order to regulate the amount of heat released into the interior portion of building 22 and to proportion the sun power being transmitted through control device 20 and panel assembly 28 between storage and direct use. Blind assembly 80 preferably comprises a pair of brackets 82 (one of which is shown in FIG. 5) mounted to building 22 in a manner well known in the art on opposite sides of and just below the tanks so that they are stationary with respect to the tanks. A rod or cord member 84, as shown in FIG. 5, mounted below a corresponding bracket 82 is also provided so as to be movable with respect to bracket 82 in a direction parallel to the elongate direction of the bracket. Suitable louvers or blinds 86 are pivotally mounted to the brackets 82 and member 84 at two spaced apart points 88 and 90, respectively, so that when member 84 moves in its elongated direction, all the louvers pivot in concert. Each louver 86 is preferably provided with a sun power and heat absorbing coating on one side 79 and a heat and sun power reflective coating on the other side 81. For example, a sheet of aluminum can be anodized on one side and polished on the other to provide sides 79 and 81 respectively. Member 84 is movable relative to bracket 82 so that each louver 86 is pivotal about point 88 between a position, used primarily in the summer, where the louvers 86 overlap one another so that the reflective sides 81 of the louvers 86 face the incoming solar radiation as well as heat reradiated from the tanks and thus reflect it away, through a position where they are substantially open and parallel to the incoming radiation, primarily used in the winter, to a position wherein the sides 79 of louvers 86 face and absorb the incoming solar radiation and convert and reradiate the heat to the tanks. The louvers are pivoted into the latter position when heat is not needed in the living spaces but must be trapped and stored for use in the coming night. The pivot lever 85 is secured to pivot with louvers 86. Means 87, responsive to room temperature, is provided for rotating pivot lever 85 and in turn louvers 86 between an open position and a position where the reflective sides 81 of the louvers 86 face the incoming solar radiation. Generally, means 87 comprises a rod, or preferably a bimetallic strip, which expands and contracts with changes in temperature. Rod 87 is fixedly mounted at one end (not shown) and constrained by fixed supports 89 so that rod 87 expands and contracts only in its longitudinal direction. The length of rod 87 and its position relative to lever 85 is adapted to be set so that as the temperature within the living space increases, at some predetermined temperature rod 87 contacts lever 85 and begins to rotate the lever from a position shown in FIG. 5 to a position shown in FIG. 5A in a clockwise direction. This has the effect of rotating the louvers from an open position to a closed position, shown in FIGS. 5 and 5A, respectively. The rod 87 is adapted to override the lever 85 so that once the louvers are fully closed, and the rod 87 continues to expand, the rod can do so without stressing the lever. A similar lever 85A, rod 87A and fixed supports 89A can be provided for rotating the louvers 86 between an open position and a position where sides 79 of the louvers 86 face the incoming solar radiation. Generally, only one of the rods is mounted at any one time to cooperate with the corresponding lever. Thus, the louvers cooperate with the tanks 72 to provide a store for the incoming solar heat and also to provide a barrier for reducing the amount of heat transfer between the interior portion of the building 72 through the roof 24.

In order to further insure the reduction of heat loss as provided in the previous embodiment described in FIG. 9, an air wash can be provided between the roof 24 and tank 72 as indicated by the arrows A (or in a direction opposite arrows A). As the air moves between the roof 24 and tank 72, heat radiated from the tank to the roof 24, is transferred to the air wash and heat that would be lost from the tanks 72 by convection is also transfered to the air wash. By recirculating the air wash into the interior of the building by using any suitable means such as ventilation system shown in FIG. 9 and described in greater detail hereinafter, heat which other wise may have been completely lost is partially recovered and recirculated through building 22.

Referring to FIG. 9, an alternative embodiment is described. In this embodiment which is actually preferred, assembly 28B is replaced by one or more sheets (four sheets 28C, D, E, F being shown) of a suitable plastic material such as an acetate. The sheets are preferably spaced from and disposed parallel to one another as well as to assembly 28A. The sheets may be secured in any manner known to those skilled in the art so that each is under slight tension and so that they maintain their spaced relationship. Preferably, each sheet is sealed along three of its edges while open at its fourth edge. The open edge is staggered with respect to the open edge of adjacent sheets in order to form an air flow path between the sheets. More specifically, sheets 28C and E are sealed along their top and side edges while sheets 28D and F are sealed along their bottom and side edges. In this embodiment shown, air is introduced, in a manner to be described in greater detail hereinafter, at the bottom of roof 24 between panel 28A and control device 20. Air spaces are provided at the top of control device 20, such as shown at 53 and at the bottom of sheet 28C so that an air flow path is provided in an upper direction between assembly 28A and control device 20, around the air space 53, down the space between control device 20 and sheet 28C, up between the space between sheets 28C and D, down between the space between sheets 28D and E, up between sheets 28 E and F and into the building. As such, heat trapped between the assembly 28A and the innermost sheet 28F is carried into the building by the air wash. This incoming air replaces the air removed by or through air ventilation stack 144 (shown in FIG. 1) or by other like means known in the art. In summer the direction of air flow is reversed so that the heat entering the building is washed out. Further, the space above the tanks 72 is opened to the night air to remove excess heat of the previous day. The same effect can be achieved by circulating cool ground water through the tanks. An unexpected benefit of the staircase construction is that in winter the multiple reflections from the plurality of sheets 28C-F are almost all directed into the building by virtue of the back reflection provided by control device 20 while in summer the sun power reflected from the multiple inner glazing largely leaves by substantially the same path it entered.

A second air wash can be circulated by blower 106 which draws air and heat from the space above the ceiling through duct 102 into the interior rooms of lower floors of building 22 so as to recover heat which otherwise may have been lost. Ducts 104 provide air flow from these interior rooms to the space above the ceiling in order to reduce heat losses from the interior of the building through roof 24.

The embodiment of FIG. 9 also includes tanks 72A modified so that they can be installed as part of the ceiling. Tanks 72A are different from the tanks 72 in that tanks 72A are formed in a substantially, rectangular block-shaped configuration. Tanks 72A are of sufficient dimensions for multiple adjacent units to extend the entire length and width of the ceiling. A suitable electric lighting system 94 may be provided above or between tanks 72A in order to illuminate the rooms below. Any heat directed through tanks 72A from each light or convected from the lights between the tanks, will be absorbed by the heat absorbing fluid in each tank. The lights themselves may serve as an auxiliary heat source should one be required. This location of an auxiliary heat source insures that the non-radiated part of the auxiliary heat is saved by entering the heat stores. Further heat-sensitive valves 98 of a type well known in the art can be suitably connected to tanks 72A and the fluid in the tanks may be of a non-flammable material in order to provide a fire extinguisher system. More specifically, the valve which extends below the tanks, are normally closed. When the temperature in the room exceeds some predetermined temperature, e.g. 60° C., the valves will open and the fluid under slight pressure from above the valve will flow out the valve. Alternatively, tanks 72A may be made of a puncturable material such as polyethylene, so that by puncturing a tank located above a fire, the latter can be doused with the non-flammable fluid.

Hot water pipes 96, may be inserted between or within tanks 72A so as to heat or preheat domestic hot water. These, or similar pipes, can circulate cool ground water in summer for removing excess heat from the tanks.

In order to further insure a minimization of heat loss from the interior of the building out, wall 35 is provided with double glazing window unit 110 shown in detail in FIGS. 10-14. Each double glazing unit comprises an exterior panel 112 and an interior panel 114 mounted parallel to one another to provide a chamber therebetween. These panels are transparent to both solar heat and light. Exterior panel 112 is secured with respect to the upper supporting lintel 116 so as to provide air passageway 118 from the outside of the building between fascia 120 and panel 112 as well as between lintel 116 and panel 112. Similarly, interior panel 114 is mounted in the window so as to provide a similar air passageway 122 between panel 114 and interior fascia 124 and between lintel 116 and panel 114. Passageways 118 and 122 are preferably filled with a suitable air filtering, fibrous material, such as glass wool, the density of which is dependent on the desired air flow rate through the window, as will be evident hereinafter. Each window is provided with two brackets 126. The bracket may be simply a strip, such as wood lath, which is bent to provide a curved or arcuate shape. Alternatively, the bracket is made of a metal, such as extruded aluminum to provide the particular configuration described hereinafter. Each bracket preferably is provided with a plurality of apertures 130 so that the brackets can be mounted at opposite sides of the window with the convex side of each bracket facing outwardly. The brackets are mounted so that the top of the bracket is secured adjacent to a window septum 128, the latter extending across and partially down from lintel 116. Each alternate bracket further includes a groove 132 which extends along the entire length of the convex side of bracket 126. A spring-biased roller shade 134, preferably made of a heat reflective material and being dimensioned to extend the width and the height of window 110, is mounted at the bottom or the top of the opening provided by panels 112 and 114 between the brackets 126A and 126B. The shade is provided with two cords 136A and 136B which extend along the corresponding groove 132 of brackets 126A and B. Reversible motor 138 mounted adjacent the side of the window includes a shaft 140 mounted in suitable bearings (not shown) and extending along the edge of the window opposite the roller and adjacent the grooves 132 of each of the brackets. The end of each cord 136 is attached to shaft 142 so that when motor 138 is energized both cords 136 will be wound on shaft 140. Since the shade has a stiff leading edge and the curvature of the bracket is slight or gently arcuate-shaped, the cords 136 will remain on the brackets under tension and the edges of the shade will follow the convex contour of the brackets. The curved brackets insure the tight seal along the vertical edges of the shade as is required to minimize heat loss.

Air is drawn through window 110 by reducing the pressure within the building in any suitable manner, such as by the air ventilating stack 144, shown in FIG. 1, or any other similar structure known in the art. When motor 138 is energized and the shade drawn nearly all the way down, air will be transmitted through passageway 118 between the panel 112 and shade 134 and panel 114 through the passageway 122 into the interior of the room. Heat escaping through panel 114, toward panel 112, is partially reflected back into the building and partially retrieved by the air passing therethrough. Similarly, during warm weather, the building can be pressurized and solar heat striking the drawn shade will be reflected away and an air wash will carry any heat absorbed by the glass out. When it is desired to transmit heat and light through window 110, motor 138 is energized to unwind cords 136 from shaft 140 so that shade 134 is retracted due to the fact that it is wound on a spring biased roller. It has been discovered that by positioning passageways 118 and 122 at the top of the window, regardless of whether the shade is extended or retracted, the air will still follow a path down the inside of the cooler panel 112 and up the warmer inner side of panel 114 when air is entering the building during winter months and a reverse path down cooler panel 114 and up warmer panel 112 when air is leaving the building.

Figures 10, 11:
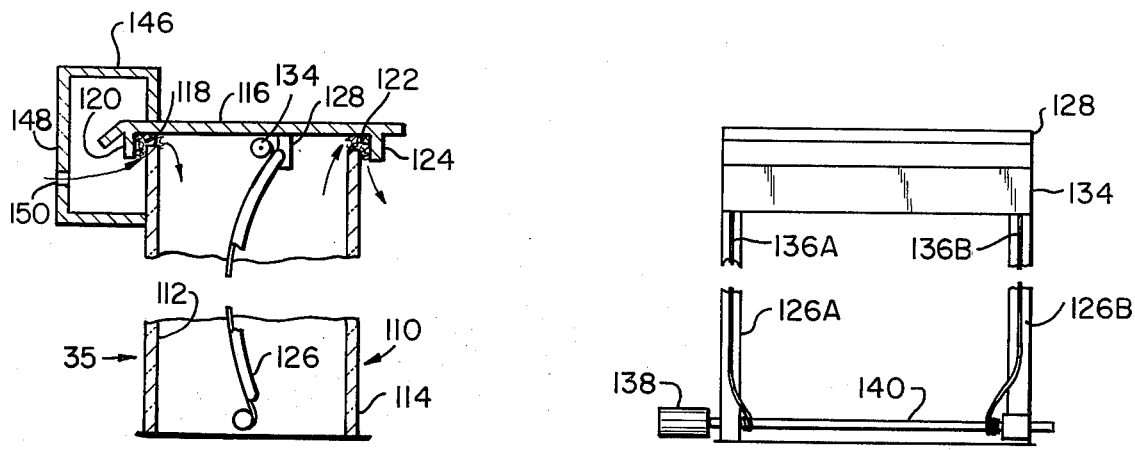
FIG. 10 is a cross-sectional view, partially broken away, of a window of a ventilation system which is useful with the present invention.
FIG. 11 is a frontal view, partially broken away, of the window assembly of FIG. 10.
Figures 12, 13, 14:
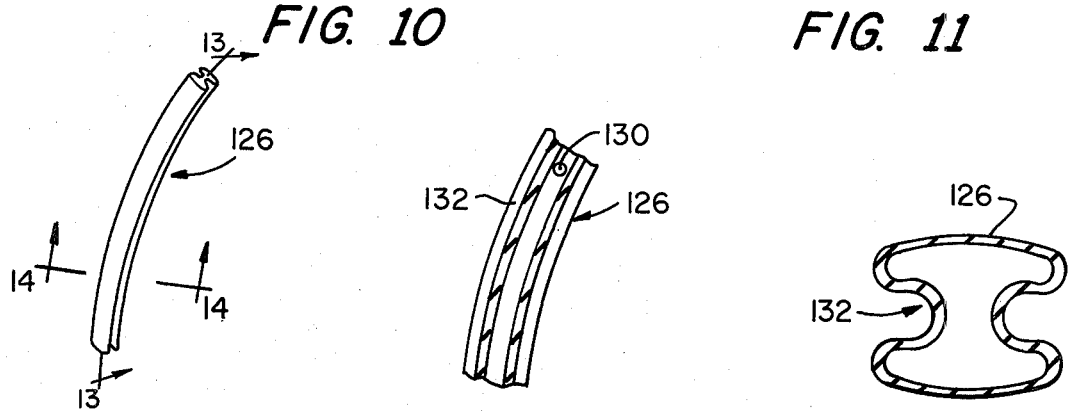
FIG. 12 is a perspective view of a bracket useful in the window assembly of FIG. 10.
FIG. 13 is a cross-sectional view taken along line 13—13 of FIG. 12.
FIG. 14 is an end view of the bracket of FIG. 12.

Ducts 146 can be provided along all sides of the building so that air entering air passageway 118 of all the windows tends to be at an equalized pressure in spite of external wind pressures. The internal cross-sectional dimensions of the ducts 146 are relatively large compared to the similar dimensions of passageways 118 so that the air pressure in the duct closely approximates that of the interior of the building. Duct 146 includes a plurality of openings 148 for fluidly connecting the exterior of the building with the interior of the duct. Flaps 150 can also be provided to insure one way air flow as shown in FIG. 10, for example, flaps 140 will allow air to flow from the exterior of the building into duct 146.

The above described invention thus provides an improved lighting, heating, ventilating and air conditioning system. The solar heat and light control device selectively controls the transmission of solar heat and light into the enclosed structure as a function of time of year and minimizes the amount of heat loss from the structure. Further, the use of the block wall 60 enables a more responsive yet inexpensive heat store by utilizing ordinary construction materials. Also, the heat source provided by the tanks 72 and 72A, as well as the retractable shades 134 reduce the amount of heat loss through the roof 24 and side window 110, respectively.

Since certain changes may be made in the above apparatus without departing from the scope of the invention herein involved, it is intended that all matter contained in the abovedesciption or shown in the accompanying drawing shall be interpreted in an illustrative and not in a limiting sense.

What is claimed is:

1. A device for controlling the amount of incoming solar radiation entering an enclosed structure and for reducing the amount of interior heat radiation loss from said structure, said device comprising, in combination:
a first plurality of substantially flat members each substantially reflective to said solar radiation;
a second plurality of substantially flat members, each substantially transmissive to said solar radiation;
means for securing said first and second plurality of substantially flat members to one another and to said enclosed structure so that said members of said first plurality are oriented in substantially horizontal parallel planes between adjacent members of said second plurality and members of said second plurality are oriented in substantially vertical parallel planes between adjacent members of said first plurality so as to form a staircase-like construction, and so that said construction is inclined from the top of said construction to the bottom of said construction toward the equator and so that said incoming solar radiation, the direction of which varies according to the altitude and azimuth of the sun, is transmitted at least in part directly through said members of said second plurality when the sun is at average winter altitudes and substantially reflected from said members of said first plurality away from said enclosed structure when the sun is at average summer altitudes; and
a pair of panel assemblies mountable on said enclosed structure so as to be spaced and disposed parallel to one another on the interior and exterior sides of said first and second plurality of said members.

2. A device in accordance with claim 1 wherein each of said first plurality of substantially flat members is substantially reflective to room temperature radiation.

3. A device in accordance with claim 1 wherein each of said second plurality of substantially flat members is reflective to room temperature radiation.

4. A device in accordance with claim 1, wherein said panel assembly mountable on the exterior side of said members is supportable by said members.

5. A device in accordance with claim 1 wherein said panel assembly mountable on the interior side includes a plurality of sheets.

6. A device in accordance with claim 1 wherein said assemblies are sealable along their edges to form a chamber, said chamber providing a heat insulating barrier to said interior heat radidation so as to reduce the amount of interior heat radiation loss from said structure.

7. A device in accordance with claim 6 wherein said chamber is evacuated to provide a partial vacuum therein.

8. A device in accordance with claim 6 wherein said chamber is filled with a fluid of low thermal conductivity.

9. A device in accordance with claim 1 wherein each of said assemblies includes a plurality of panel units and means for securing said panel units together.

10. A device in accordance with claim 9 wherein said means for securing said panel units together includes means for hermetically sealing the edges of said panels together and for absorbing shock and vibration between said panels.

11. A device in accordance with claim 1 wherein said members of said first plurality are each provided with front and rear longitudinal edges and said members of said second plurality are each provided with upper and lower longitudinal edges so that the front longitudinal edge of each of said members of said first plurality are securable to the upper longitudinal edge of a member of said second plurality, and the rear longitudinal edge of each of said members of said first plurality are securable to the lower edge of a member of said second plurality so as to form said staircase construction.

12. A device in accordance with claim 11 wherein said front and rear longitudinal edges of said members of said first plurality are integrally formed with, respectively, the top and bottom longitudinal edges of said members of said second plurality.

13. A device in accordance with claim 12 wherein said members of said first and second plurality are formed of a material transparent to said solar radiation and said members of said first plurality, each include means for reflecting both said incoming solar radiation and said interior heat radiation.

14. A device in accordance with claim 1 further including means for storing said incoming solar radiation.

15. A device in accordance with claim 14 wherein said means for storing includes a wall having a surface exposed to said incoming solar radiation and comprising a plurality of horizontally spaced, heat-absorbing blocks having air spaces provided from said exposed surface between at least some of said blocks in order to increase the heat transfer surface area of said exposed surface of said wall.

16. A device in accordance with claim 15 further including means for controlling the relative heat transfer between said means for storing and the interior of said enclosed structure.

17. A device in accordance with claim 14 wherein said means for storing includes a plurality of tanks each containing a heat-absorbing material.

18. A device in accordance with claim 17 wherein said heat-absorbing material is non-flamable.

19. A device in accordance with claim 17 wherein said tanks are made of a material transmissive to said solar radiation.

20. A device in accordance with claim 17 wherein said plurality of tanks are mountable so as to be spaced from said first and second plurality of members, said device further including ventilating means for passing air through the space provided between said plurality of tanks and said first and second plurality of said members so as to reduce the amount of interior heat radidation loss from said structure.

21. A device in accordance with claim 14 further including means for regulating the amount of heat transferred to and from said means for storing said incoming solar radiation.

22. Apparatus for controlling the amount of solar radiation entering an enclosed structure comprising, in combination;

a plurality of window units, each of said units including means for reducing the amount of heat transfer through said unit, at least two panels transmissive to said solar radiation, and means for drawing air from the exterior of said structure along a path defined between said panels to the interior of said structure so as to reduce the loss of heat from the interior of said structure through said units; and means disposable around the perimeter of said structure for providing air exterior of and from all sides of said structure to said path defined between said panels of each unit so as to substantially equalize the pressure of said air drawn through said units.

23. Apparatus in accordance with claim 22, wherein said means disposed around said perimeter of said structure includes means defining an air passageway around the perimeter of said building, said apparatus further including a retractable sheet and means for guiding said sheet so that when extended said sheet assumes a convex, contoured shape and defines at least in part said path between said panels.

24. Apparatus for controlling the amount of direct solar heat and light entering an enclosed structure, said apparatus comprising, in combination;

tank storage means substantially transparent to said light for absorbing at least a part of said direct solar heat and for reradiating stored heat into the interior of said enclosed structure; and a plurality of adjustable louvers disposed between said tank storage means and said interior of said enclosed structure for controlling the heat and light transfer between the sun and the interior of said enclosed structure and the heat and light transfer between said tank means and the interior of said enclosed structure.

25. Apparatus according to claim 24, wherein each of said louvers is provided with a heat reflective surface on one side of said louver and a heat absorptive surface on the other side of said louver, said louvers being movable in concert among (1) a first position wherein the heat reflective surfaces are adjacent said tank storage means so that solar heat passing through said tank storage means and stored heat reradiated by said tank storage means are reflected back toward said tank storage means, (2) a second position so that solar heat passing through said tank storage means and stored heat reradiated by said tank storage means are passed through said louvers into said enclosed structure, and (3) a third position wherein the heat absorptive surfaces are adjacent said tank storage means for absorbing solar heat passing through said tank storage means and stored heat reradiated by said tank storage means and for reradiating heat to said tanks storage means so that the latter will absorb at least part of reradiated heat from said absorptive surfaces.

26. Apparatus according to claim 24, further including pipe means adapted to transport a heat transfer fluid, for transferring heat absorbed by said tank storage means to said fluid.

27. Apparatus according to claim 24, wherein said tank storage means includes a plurality of tanks and means for passing air adjacent said tanks.

28. For use in an enclosed structure, a device including a window unit comprising:

at least two spaced apart panels transmissive to solar radiation;

a retractable shade disposed between said panels for controlling the amount of said solar radiation transmitted through said panels, said shade being retractable to a retracted position wherein solar radiation is transmitted through said panels and extendable to an extended position so as to reduce the amount of solar radiation transmitted through said panels;

means for drawing air along a path from the exterior of said enclosed structure, through the space between said panels to the interior of said enclosed structure so as to reduce the loss of heat from the interior of said enclosure to the exterior of said enclosure; and means for guiding said shade so that when said shade is extended to said extended position said shade assumes a convex, contoured shape to define said path for said air between said panels.

29. A device in accordance with claim, 28, further including a plurality of said window units and means tending to make the pressure of said air drawn through each of said units equal.

30. A device according to claim 29, wherein said means tending to make the pressure of said air equal includes a duct along all sides of said enclosure; a plurality of openings in said duct distributed along all sides of said enclosure for fluidly connecting the exterior of said enclosure with the interior of said duct and air passageways of relatively small cross-sectional dimensions relative to the cross-sectional dimensions of said duct for fluidly connecting the interior of said duct with said plurality of units so that air can be drawn from the exterior of said structure into said duct and through said passageways along said path defined between said panels of each of said window units.

* * * * *